United States Patent
V

(10) Patent No.: US 12,532,176 B2
(45) Date of Patent: Jan. 20, 2026

(54) IDENTIFYING HIDDEN SERVICE SET IDENTIFIERS (SSIDs) OF UNAUTHORIZED ACCESS POINTS ON A WIRELESS NETWORK

(71) Applicant: Fortinet, Inc., Sunnyvale, CA (US)

(72) Inventor: Vijayakumar V, Ulsoor (IN)

(73) Assignee: Fortinet, Inc., Sunnyvale, CA (US)

( * ) Notice: Subject to any disclaimer, the term of this patent is extended or adjusted under 35 U.S.C. 154(b) by 425 days.

(21) Appl. No.: 17/852,256

(22) Filed: Jun. 28, 2022

(65) Prior Publication Data

US 2023/0422037 A1    Dec. 28, 2023

(51) Int. Cl.
*H04W 12/121*    (2021.01)
*H04W 12/73*    (2021.01)

(52) U.S. Cl.
CPC ......... *H04W 12/121* (2021.01); *H04W 12/73* (2021.01)

(58) Field of Classification Search
CPC ............................ H04W 12/121; H04W 48/16
USPC ....................................................... 455/410
See application file for complete search history.

(56) References Cited

U.S. PATENT DOCUMENTS

| | | | | |
|---|---|---|---|---|
| 7,823,199 B1* | 10/2010 | Rathi | .................. | H04L 63/1441 380/278 |
| 2014/0337950 A1* | 11/2014 | Yang | ..................... | H04L 9/3297 726/7 |
| 2019/0149994 A1* | 5/2019 | Van Antwerp | ........ | H04W 12/12 726/4 |
| 2023/0099706 A1* | 3/2023 | Ham | .................. | H04L 63/1483 726/6 |

* cited by examiner

*Primary Examiner* — Sam K Ahn
(74) *Attorney, Agent, or Firm* — Law Office of Dorian Cartwright; Dorian Cartwright

(57) ABSTRACT

An unauthorized access point is identified during a periodic scan on the wireless network and storing a MAC address for the unauthorized access point and monitored for connection attempts. The unauthorized access point, due to having a hidden SSID, is monitored by the MAC address for data packets sent and received. At least one client associated to the unauthorized access point is identified from the data packets by MAC address. The at least one client is monitored, by the MAC address, for a probe request sent to the unauthorized access point. Responsive to detecting the probe request, an SSID of the unauthorized access point is parsed. A security action on the unauthorized access point using the SSID.

18 Claims, 6 Drawing Sheets

IDENTIFYING HIDDEN SERVICE SET IDENTIFIERS (SSIDs) OF UNAUTHORIZED ACCESS POINTS ON A WIRELESS NETWORK

FIELD OF THE INVENTION

The invention relates generally to computer networking, and more specifically, to identifying a hidden service set identifier (SSID) of an unauthorized access point on a wireless network.

BACKGROUND

Wireless computing technologies provide untethered access to the Internet and other networks. One of the most critical technologies for wireless networking is the Institute of Electrical and Electronics Engineers (IEEE) 802.11 family of protocols promulgated by the IEEE. Currently, the protocols are widely adopted in wireless devices such as laptop computers, tablet computers, smart phones, and network access applications. Many networks with wireless devices use an access point (access point) with a radio and antenna as an interface between wireless devices and the backbone network which is typically wired. Wireless devices can discover available access points within range of their radios by listening for beacons broadcast by access points which include an identifier such as an SSID. Wireless devices use the identifier in a probe request to initiate a connection to the identified access point.

One problem with networks for wireless devices is that unauthorized access points can be introduced to the system and advertise a connection point to wireless devices. Wireless devices may be unaware of which access points are authorized and unsuspectingly respond to a beacon. This situation causes a serious vulnerability to an entity because the unauthorized access point may then become privy to confidential information transferred to and from unsuspecting wireless devices, allowing data theft. Operators of unauthorized access points are not always devious. In one case, an employee adds an additional access point to an area with poor coverage, without realizing the consequences.

Furthermore, the unauthorized access point is not subject to policies and procedures promulgated by network administrators through access points. For example, undesirable wireless devices making prohibited data transfers, such as video downloads or chat sessions, can steal network bandwidth from other operations more critical to the entity. Some techniques detect rogue access points already associated with wireless stations. For example, U.S. Pat. No. 9,681,250 disrupts connections with spoofed management frames.

However, these techniques fail to prevent the connection of unauthorized devices in the first place. Moreover, rogue access points may enable a hidden SSID feature making the SSID invisible to devices searching for a new network to join.

What is needed is a robust technique for identifying a hidden SSID of an unauthorized access point on a wireless network.

SUMMARY

To meet the above-described needs, methods, computer program products, and systems for identifying a hidden SSID of an unauthorized access point on a wireless network. The SSID can then be used for remediation.

In one embodiment, during a periodic scan with a network communication interface, an unauthorized access point is identified on the wireless network and a MAC address for the unauthorized access point is stored, when no SSID is available (e.g., due to a hidden SSID feature). The unauthorized access point is monitored by the MAC address for data packets sent and received. At least one client associated to the unauthorized access point is identified from the data packets by MAC address.

In another embodiment, the at least one client is monitored, by the MAC address, for a probe request sent to the unauthorized access point. Responsive to detecting the probe request, an SSID of the unauthorized access point is parsed.

In still other embodiments, a security action on the unauthorized access point using the SSID. A variety of security actions can be taken once the SSID is exposed. For example, firewall rules or other data packet processing rules can be configured for the exposed SSID to detect communications. In another example, when association is detected to be in process, a channel switching element can be sent to the client to avoid association with the unauthorized access point.

Advantageously, network security is improved. In turn, network devices will operate better without interference from rogue devices.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

Methods, computer program products, and systems for preventing connections to unauthorized access points with channel switch announcements. One of ordinary skill in the art will recognize many alternative embodiments that are not explicitly listed based on the following disclosure.

Figure 1:
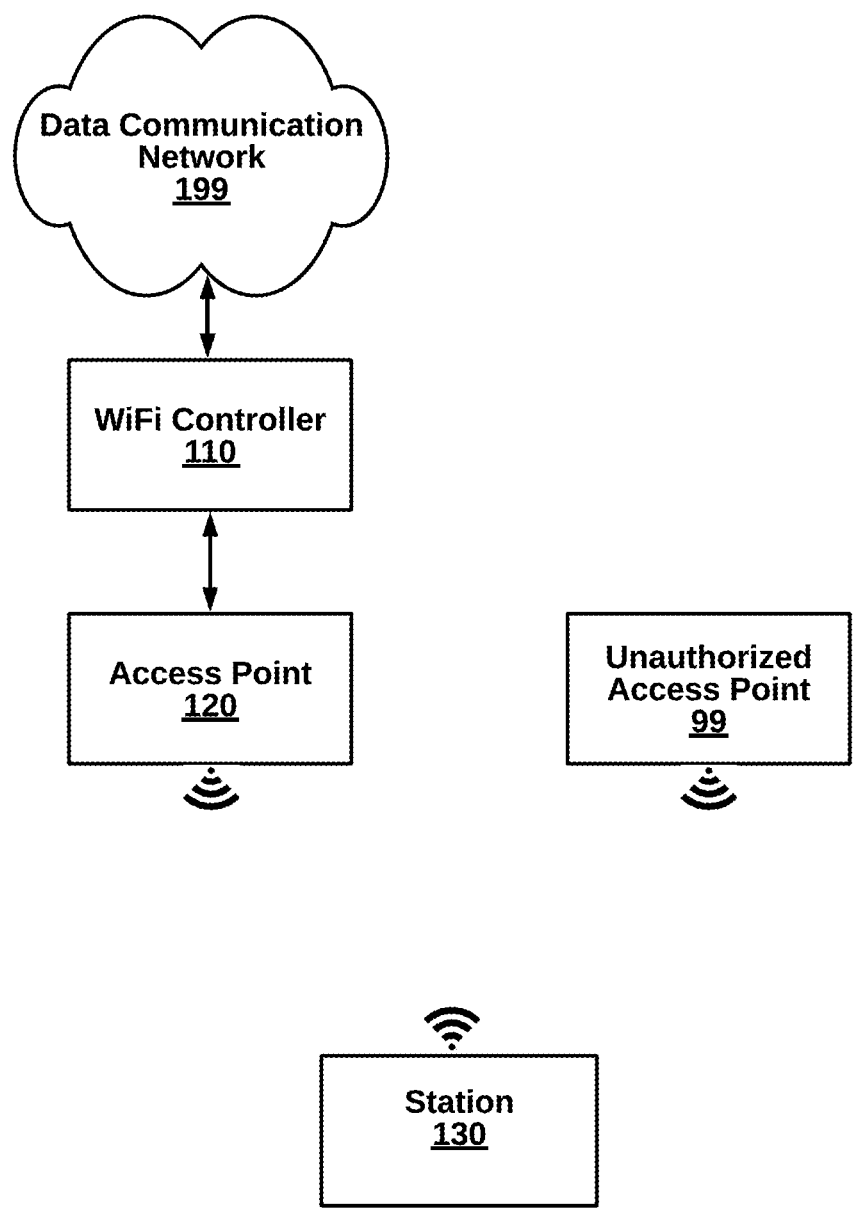
FIG. 1 is a high-level block diagram illustrating a system for identifying a hidden SSID of an unauthorized access point on a wireless network, according to one embodiment.
Figure 2:
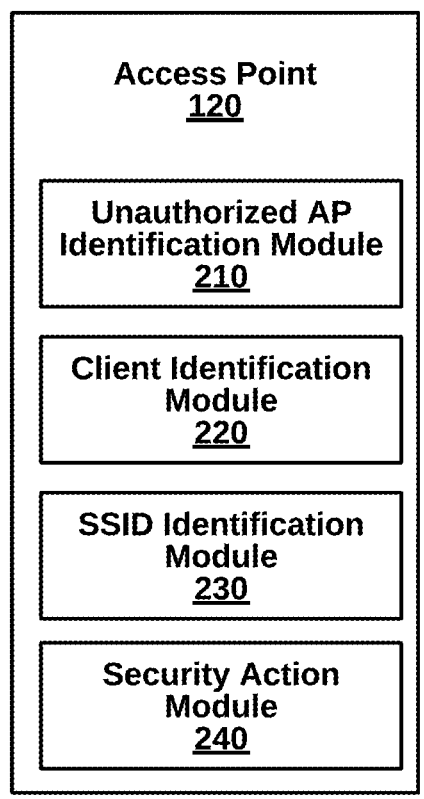
FIG. 2 is a more detailed block diagram illustrating an authorized access point of the system of FIG. 1, according to one embodiment.
Figure 3:
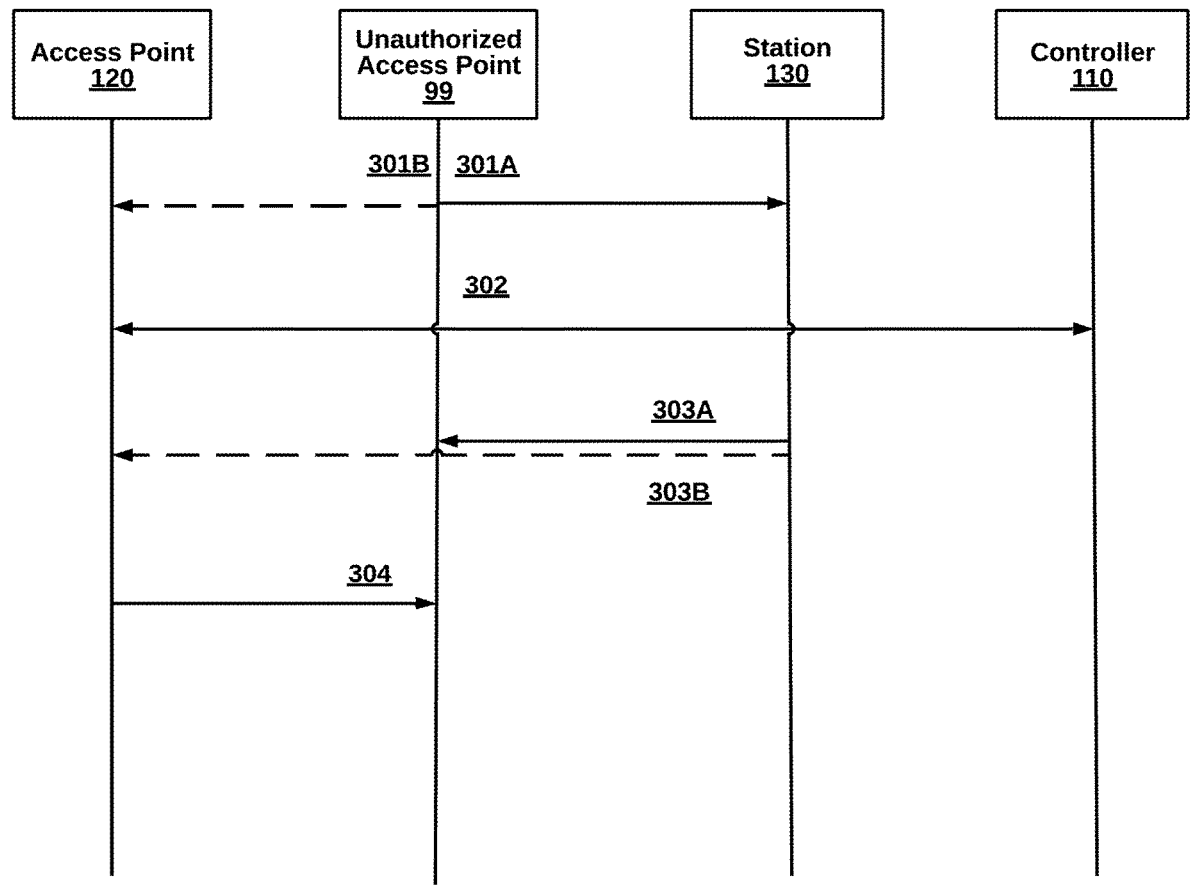
FIG. 3 is a sequence diagram for interactions between the components of the system of FIG. 1, according to one embodiment.

Systems for Securing Against Hidden SSIDs (FIGS. 1-3)

FIG. 1 is a high-level block diagram illustrating a system for identifying a hidden SSID of an unauthorized access point on a wireless network, according to one embodiment. The system 100 includes an access point 120, a station 130 and an optional Wi-Fi controller 110 coupled in communication with a data communication network 99. There is an unauthorized access point 99 within RF range of the station

130. Other embodiments of the system 100 can include additional network components that are not shown in FIG. 1. For example, there can be more access points (authorized and unauthorized) and more stations. There can also be network devices such as switches, routers, fire walls, proxy servers, and the like.

The components of the system 100 are coupled in communication over the data communication network. The components can be connected to the data communication system via hard wire (e.g., the controller 110 and the access point 120). The components can also be connected via wireless networking (e.g., the station 130). The data communication network 199 can be composed of any data communication network such as an SDWAN, an SDN (Software Defined Network), WAN, a LAN, WLAN, a cellular network (e.g., 3G, 4G, 5G or 6G), or a hybrid of different types of networks. Various data protocols can dictate format for the data packets. For example, Wi-Fi data packets can be formatted according to IEEE 802.11, IEEE 802.11r, and the like. Components can use IPv4 or IPv6 address spaces.

The access point (i.e., authorized access point) 120 secures the wireless network against rogue access points using hidden SSIDs. In one embodiment, clients of the unauthorized access point are identified and monitored for probe requests. When a probe request has an SSID, parsing of the probe request exposes the SSID for taking security actions against rogue access points. When a probe request does not have an SSID (e.g., because hidden SSID is enabled at the access point), the probe request is parsed to expose the MAC address which in turn is processed to determine the SSID. In one embodiment, the access point 120 operates in with hidden SSID enabled for its own selected transmissions.

The unauthorized (or rogue) access point 99 can have a hidden SSID feature enabled via hardware or software, automatically or manually. Generally, the unauthorized access point 99 can be an identical or similar device to the (authorized) access point 120. The characterization as unauthorized refers to whether or not access points have permission to join a network or communication with a particular station. For example, an employee of a company can bring a personal access point from home and connect it to the wired network backbone to provide better coverage area or strength to a local area network. Also, a data thief can set up a covert access point in a parking lot of a company. In still another example, the unauthorized access point 99 may be friendly to the network, but has not yet completed its own authentication or association in a satisfactory manner because of many reasons. Additionally, an authorized access point can be manually deauthorized by a network administrator or automatically deauthorized due to abnormal behavior (e.g., high network usage).

There are three states to describe the relationship between access points or unauthorized access points, with mobile stations: 1) unauthenticated and unassociated; 2) authenticated and unassociated; and 3) authenticated and associated. An additional level of IEEE 802.1x authentication is available. Initially both access points and mobile stations are in state 1. After selecting access points for network access, and successful completion of a challenge-response sequence (e.g., WEP shared key authentication), the components move to state 2. Finally, mobile stations associate with access points to move to state 3. Upon receiving a disassociation request, the components return to state 2, or upon receiving a de-authentication request, the components return to state 1 from either state 2 or 3. Messages cannot be exchanged in either states 1 or 2, but the components are preferably returned to state 1 in which the keys and states are deleted and both authentication and association are required to reestablish unauthorized communications. In one embodiment, a security action upon determining a hidden SSID is to deauthenticate the client from unauthorized access points and reauthenticate with authorized access points.

In still other embodiments, the access point 120 can coordinate hidden SSID operations with other access points through the controller 110. Additionally, earlier interactions with the access point 120 can be stored at the controller 110 as historical information for subsequent interactions with the access point 120. More generally, the access point 120 and other authorized access points operate under the direction of the controller 110 in some layouts. The controller 110 is above the access point 120 in a network hierarchy, allowing the controller 110 to provide high-level management of the access point 120 and other access points in the network. For example, the controller 110 can maintain a list of unauthorized (and specifically authorized) SSIDs and/or MACs and periodically check for reconnections. In another example, when an unauthorized connection with one mobile station is discovered, the controller 110 can direct other access points to check their coverage areas for the same unauthorized access point. Moreover, the controller 110 can maintain a list of overrides (e.g., not officially authorized access points) to stop the access point 120 from initiating a disconnection.

Figure 6:
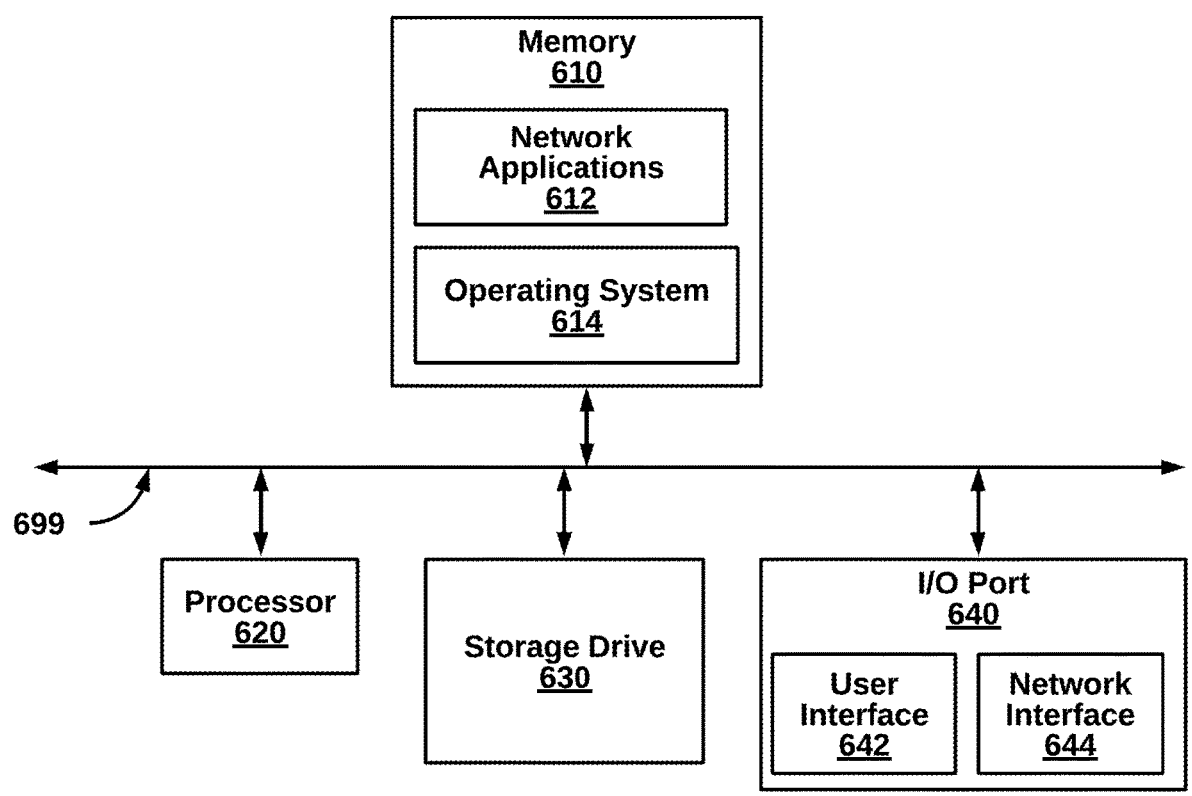
FIG. 6 is a block diagram illustrating an exemplary computing device, according to one embodiment.

The access point 120 can be any of the computing devices, such as a personal computer, a server blade, any computing environment as shown in FIG. 6. The access point 120 is preferably connected to the network (or to a switch, router, hub, or another access point that is connected to the network 99) via a wired or wireless connection. The access point 120 can be set-up in various configurations with other access points to provide wireless coverage areas. In one embodiment, the functionality is incorporated into a switch or router, and in another embodiment, is incorporated into a custom enclosure. In operation, the access point 120 transmits network packets to and from station 130.

Additional embodiments of the access point 120 are set forth below in FIG. 2.

The station 130 can be connected to the unauthorized access point, assuming it to be authorized. Consequentially, the station 130 may be vulnerable to malicious actions by the unauthorized access point. At other points in time, the station 130 can be connected to authorized access points. To connect with access points, the station 130 transmits a probe request frame with an embedded SSID to an access point. Even if the unauthorized access point 99 hides its SSID, the station 130 already has the information and continues to use it for probe requests.

The station 130 can be, for example, a mobile station, STA, client or wireless device, a personal computer, laptop, tablet computer, smart phone, mobile computing device, Internet access applications, end station or any other computing device as described in FIG. 6. Station 130 is wirelessly couples to access points using a radio and antenna. No pre-configuration or client is needed. The station 130 operates according to wireless standards such as IEEE 802.11a, b, g, n, ac, w or any other wireless standard. The station 130 sends and/or receives network packets for access applications being executed.

FIG. 2 is a more detailed block diagram illustrating the (authorized) access point 120 of the system of FIG. 1, according to one embodiment. The access point 120 includes an unauthorized access point identification module 210, a client identification module 220, an SSID identification module 230, and a security action module 240. The components can be implemented in hardware, software, or a combination of both.

The unauthorized access point identification module 210, periodically scans a wireless network with a network communication interface. In one case, commands are sent from an operating system to drivers for a Wi-Fi transceiver. A receiver captures data packets sent over the wireless network, and parses headers of the data packets to expose MAC addresses. An unauthorized access point is identified on the wireless network. When a probe request has an SSID, the probe request is parsed to expose the SSID. When a probe request does not have an SSID (e.g., because hidden SSID is enabled at the access point), the probe request is parsed to expose the MAC address which in turn is processed to determine the SSID. To do so, the MAC address is first stored for the unauthorized access point. A table or database or MAC addresses can be stored locally or remotely, such as on the controller 110.

The client identification module 220 monitors the unauthorized access point by the MAC address for data packets sent and received. At least one client associated to the unauthorized access point is identified from the data packets by MAC address.

The SSID identification module 230 monitors the at least one client, by the MAC address, for a probe request sent to the unauthorized access point. Responsive to detecting the probe request. In response, an SSID of the unauthorized access point is parsed. One embodiment further confirms the SSID. To do so, the access point sends directed unicast probe request with identified SSID to the unauthorized access point.

The security action module 240 can take a security action on the unauthorized access point using the SSID. A variety of security actions can be taken once the SSID is exposed. For example, firewall rules or other data packet processing rules can be configured for the exposed SSID to detect communications. In another example, when association is detected to be in process, a channel switching element can be sent to the client to avoid association with the unauthorized access point. In yet another example, unauthorized access points can be removed from the wireless network, quarantined, flagged, or added to a malicious actor database.

Other aspects of the access point 120 can include network access applications, such as a network browser, a VOIP telephone service, a streaming video player, a database viewer, a VPN client, and the like. The operating system is responsible for connecting to a communication channel for data exchange, among other tasks. To do so, the operating system listens for beacons broadcast by access points, and generates a probe request to connect to a selected access point. After connecting, the operating system 124 exchanges data packs and unpacks data packets in accordance with, e.g., a TCP/IP stack. More particularly, IEEE 802.11-type packets (e.g., IEEE 802.11ac packets) can be generated and received. The radio array includes one or more transmit (Tx) and receive (Rx) antennas and electronics (e.g., encoders/decoders) for communication with the physical layer.

FIG. 3 is a sequence diagram illustrating interactions between components of the system 100 of FIG. 1, according to one embodiment.

When the unauthorized access point 99 sends transmissions (or receives transmissions) at transmission 301A, the access point 120 can listen to the radio range in order to receive the transmission at transmission 301B. After analysis of a data packet of the transmission, the access point 120 can, in one option, coordinate with the controller 110 with respect to exposing the hidden SSID. While monitoring the station 130, a probe request transmitted from the station 130 to the unauthorized access point 99 at transmission 303A, the same probe request can be picked up by the access point 120 at transmission 303B.

Ultimately, the access point 120 takes a security action at 304B.

Figure 4:
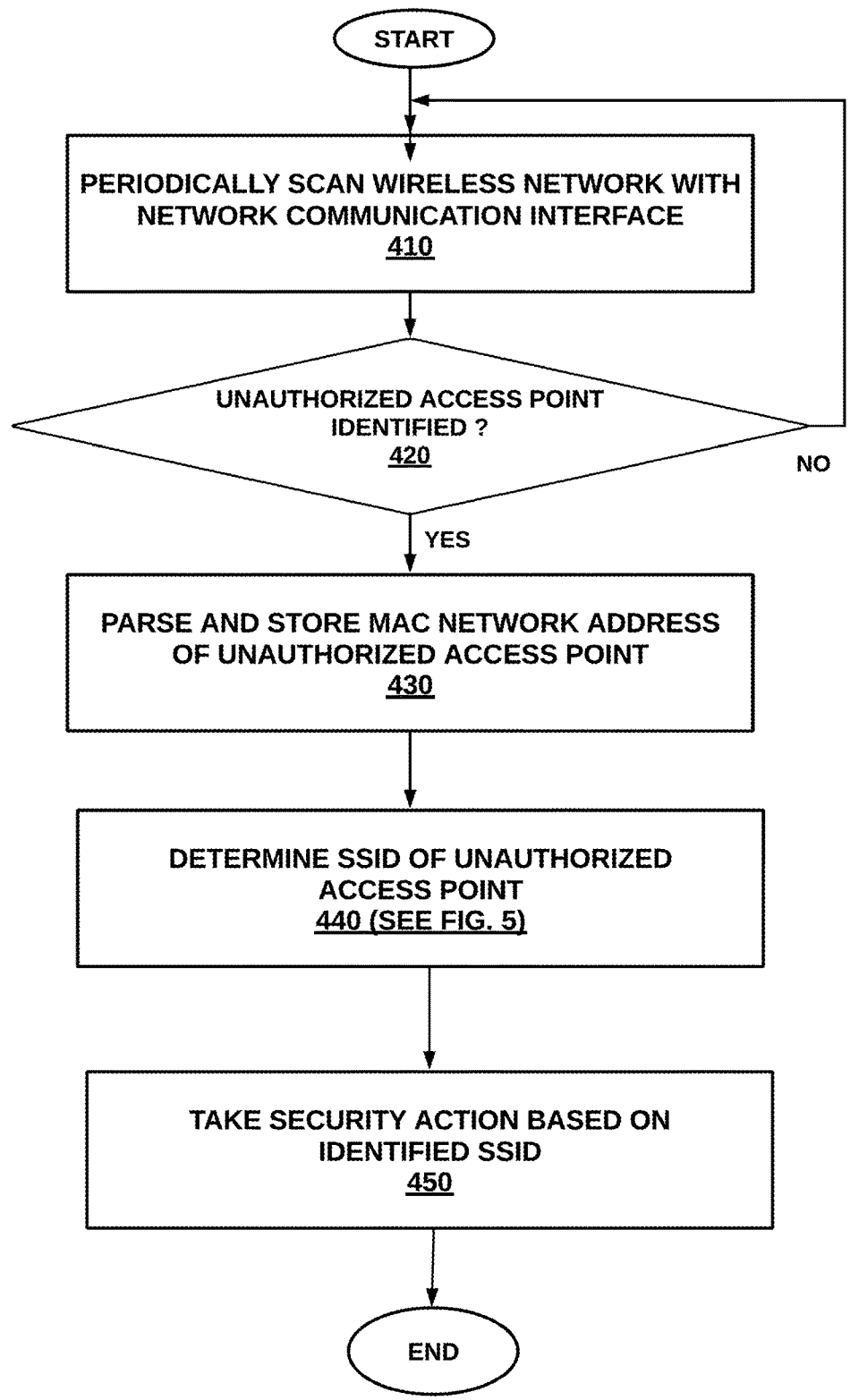
FIG. 4 is a high-level flow diagram illustrating a method for identifying a hidden SSID of an unauthorized access point on a wireless network, according to one embodiment.
Figure 5:
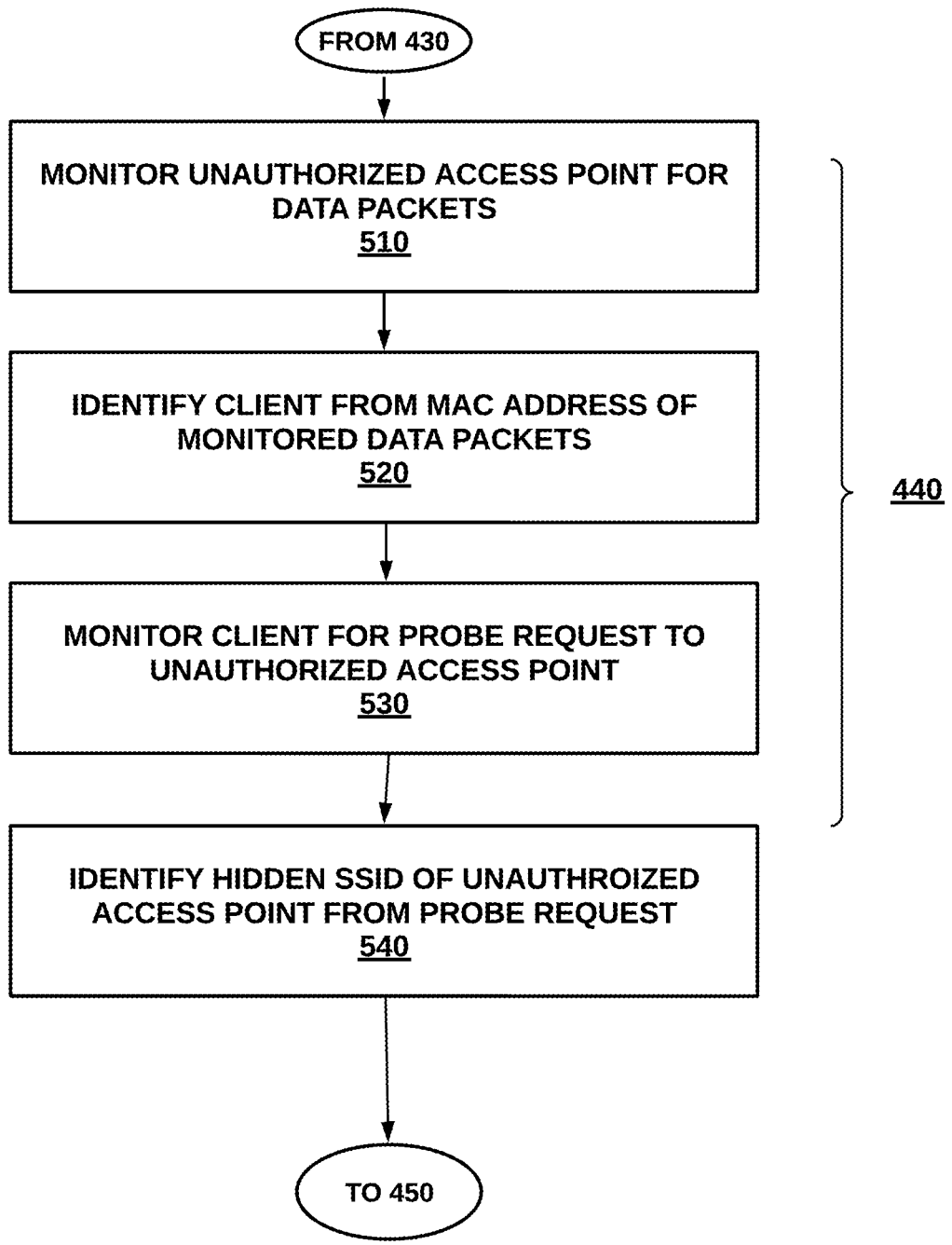
FIG. 5 is a more detailed flow diagram illustrating a step of determining the hidden SSID of an unauthorized access point on, from the method of FIG. 4, according to one embodiment.

Methods for Securing Against Hidden SSIDs (FIGS. 4-5)

FIG. 4 is a high-level flow diagram illustrating a method 400 for identifying a hidden SSID of an unauthorized access point on a wireless network, according to one embodiment. The method 400 can be implemented by, for example, an authorized access point (e.g., access point 120 of FIG. 1).

At step 410 a wireless network is periodically scanned with a network communication interface. An unauthorized access point is identified on the wireless network, at step 420, and a MAC address for the unauthorized access point is parsed and stored, at step 430.

At step 440, an SSID of the unauthorized access point is determined. One embodiment of the determination step 430 is discussed below in association with FIG. 5.

At step 450, a security action is taken on the unauthorized access point using the SSID. Different security actions are discussed above.

FIG. 5 is a more detailed flow diagram illustrating the step 430 of determining the SSID of the unauthorized access point, from the method 400 of FIG. 4, according to one embodiment.

At step 510, the unauthorized access point is monitored by the MAC address for data packets sent and received. A network data packet generally includes headers and a payload, the MAC address being embedded in a header. An exposed MAC address is compared against a source of MAC addresses that are being monitored.

At step 520, at least one client associated to the unauthorized access point is identified from the data packets by MAC address. A client identifier of the client can be stored in a table by an access point in association with the MAC address.

At step 530, the at least one client is monitored, by the MAC address, for a probe request sent to the unauthorized access point. The probe request is sent out periodically to unauthorized access points. Because the probe request is broadcast, any RF receiver within range has access to data packets even when not addressed to others.

At step 540, a probe request is detected from one of several monitored access points. In response, an SSID of the unauthorized access point is parsed.

Generic Computing Device (FIG. 6)

FIG. 6 is a block diagram illustrating an exemplary computing device 600 for use in the system 100 of FIG. 1, according to one embodiment. The computing device 600 is an exemplary device that is implementable for each of the components of the system 100, including the access point 120, and the mobile station 130 and the controller 110. Additionally, the computing device 600 is merely an example implementation itself, since the system 100 can also be fully or partially implemented with laptop computers, tablet computers, smart cell phones, Internet access applications, and the like.

The computing device 600, of the present embodiment, includes a memory 610, a processor 620, a hard drive 630, and an I/O port 640. Each of the components is coupled for electronic communication via a bus 650. Communication can be digital and/or analog, and use any suitable protocol.

The memory 610 further comprises network access applications 612 and an operating system 614. The network access applications 620 can include the modules of network access applications or access points as illustrated in FIGS. 2-4. Other network access applications can include 612 a web browser, a mobile access applications, an access applications that uses networking, a remote access applications executing locally, a network protocol access applications, a network management access applications, a network routing access applications, or the like.

The operating system 614 can be one of the Microsoft Windows® family of operating systems (e.g., Windows 98, 98, Me, Windows NT, Windows 2000, Windows XP, Windows XP x84 Edition, Windows Vista, Windows CE, Windows Mobile, Windows 7 or Windows 8), Linux, HP-UX, UNIX, Sun OS, Solaris, Mac OS X, Alpha OS, AIX, IRIX32, or IRIX84. Other operating systems may be used. Microsoft Windows is a trademark of Microsoft Corporation.

The processor 620 can be a network processor (e.g., optimized for IEEE 802.11), a general purpose processor, an access applications-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the hard drive 630.

The storage device 630 can be any non-volatile type of storage such as a magnetic disc, EEPROM, Flash, or the like. The storage device 630 stores code and data for access applications.

The I/O port 640 further comprises a user interface 642 and a network interface 644. The user interface 642 can output to a display device and receive input from, for example, a keyboard. The network interface 644 connects to a medium such as Ethernet or Wi-Fi for data input and output. In one embodiment, the network interface 644 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent access point with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical access applications. This description will enable others skilled in the art to best utilize and practice the invention in various embodiments and with various modifications as are suited to a particular use. The scope of the invention is defined by the following claims.

I claim:

1. A computer-implemented method in an access point of a data communication network and coupled to a wireless network, for securing a wireless portion of the data communication network by identifying a hidden SSID of an unauthorized access point on the wireless network, the method comprising:
   identifying, during a periodic scan with a network communication interface, an unauthorized access point on the wireless network;
   detecting a hidden SSID for the unauthorized access point, and in response, storing a MAC address for the unauthorized access point;
   monitoring the unauthorized access point by the MAC address for data packets sent and received;
   identifying at least one client associated to the unauthorized access point from the data packets by the MAC address;
   monitoring the at least one client, by the MAC address, for a probe request sent to the unauthorized access point;
   responsive to detecting the probe request and, in response, parsing an SSID of the unauthorized access point; and
   taking a security action on the unauthorized access point using the SSID.

2. The method of claim 1, wherein the periodic scan comprises listening for beacons that do not have an SSID.

3. The method of claim 1, further comprising parsing a beacon to expose a MAC address of the unauthorized access point.

4. The method of claim 1, wherein a controller maintains a list of unauthorized access point, including the unauthorized access point, to share with a plurality of access points, including the unauthorized access point.

5. The method of claim 4, wherein the controller directs at least a second access point from the plurality of access points to scan for the unauthorized access point.

6. The method of claim 1, wherein a station connects to the unauthorized access point, assuming that the unauthorized access point has been authorized by the wireless network.

7. A non-transitory computer-readable medium storing instructions that, when executed by a processor, perform a computer-implemented method in an access point of a data communication network and coupled to a wireless network, for securing a wireless portion of the data communication network by identifying a hidden SSID of an unauthorized access point on the wireless network, the method comprising:

identifying, during a periodic scan with a network communication interface, an unauthorized access point on the wireless network;
detecting a hidden SSID for the unauthorized access point, and in response, storing a MAC address for the unauthorized access point;
monitoring the unauthorized access point by the MAC address for data packets sent and received;
identifying at least one client associated to the unauthorized access point from the data packets by MAC the address;
monitoring the at least one client, by the MAC address, for a probe request sent to the unauthorized access point;
responsive to detecting the probe request and, in response, parsing an SSID of the unauthorized access point; and
taking a security action on the unauthorized access point using the SSID.

8. The non-transitory computer-readable medium performing the method of claim 7, wherein the periodic scan comprises listening for beacons that do not have an SSID.

9. The non-transitory computer-readable medium performing the method of claim 7, further comprising parsing a beacon to expose a MAC address of the unauthorized access point.

10. The non-transitory computer-readable medium performing the method of claim 7, wherein a controller maintains a list of unauthorized access point, including the unauthorized access point, to share with a plurality of access points, including the unauthorized access point.

11. The non-transitory computer-readable medium performing the method of claim 10, wherein the controller directs at least a second access point from the plurality of access points to scan for the unauthorized access point.

12. The non-transitory computer-readable medium of claim 7, wherein a station connects to the unauthorized access point, assuming that the unauthorized access point has been authorized by the wireless network.

13. An access point of a data communication network and coupled to a wireless network, for securing a wireless portion of the data communication network by identifying a hidden SSID of an unauthorized access point on the wireless network, the access point comprising:

a processor;
a network interface, communicatively coupled to the processor and to the wireless network; and
a memory, communicatively coupled to the processor and comprises:
an unauthorized device identification module to identify, during a periodic scan with a network communication interface, an access point on the wireless network, the unauthorized device identification module to detect hidden SSID for the unauthorized access point, and in response, stores a MAC address for the unauthorized access point;
a client identification module to monitor the unauthorized access point by the MAC address for data packets sent and received, and to identify at least one client associated to the unauthorized access point from the data packets by the MAC address;
an SSID identification module to monitor the at least one client, by the MAC address, for a probe request sent to the unauthorized access point, and responsive to detecting the probe request and, to parse an SSID of the unauthorized access point; and
taking a security action on the unauthorized access point using the SSID.

14. The access point of claim 13, wherein the periodic scan comprises listening for beacons that do not have an SSID.

15. The access point of claim 13, further comprising parsing a beacon to expose a MAC address of the unauthorized access point.

16. The access point of claim 13, wherein a controller maintains a list of unauthorized access point, including the unauthorized access point, to share with a plurality of access points, including the unauthorized access point.

17. The access point of claim 16, wherein the controller directs at least a second access point from the plurality of access points to scan for the unauthorized access point.

18. The access point of claim 13, wherein a station connects to the unauthorized access point, assuming that the unauthorized access point has been authorized by the wireless network.

* * * * *